United States Patent
Spry (10) Patent No.: US 8,230,068 B2
(45) Date of Patent: Jul. 24, 2012

(54) DYNAMIC COMMAND CAPACITY ALLOCATION ACROSS MULTIPLE SESSIONS AND TRANSPORTS

(75) Inventor: Andrew J. Spry, Wichita, KS (US)

(73) Assignee: NetApp, Inc., Sunnyvale, CA (US)

( * ) Notice: Subject to any disclaimer, the term of this patent is extended or adjusted under 35 U.S.C. 154(b) by 2120 days.

(21) Appl. No.: 11/002,610

(22) Filed: Dec. 2, 2004

(65) Prior Publication Data

US 2006/0123112 A1 Jun. 8, 2006

(51) Int. Cl.
*G06F 15/173* (2006.01)
(52) U.S. Cl. .......................... 709/226; 711/150
(58) Field of Classification Search .............. 709/226; 711/150
See application file for complete search history.

(56) References Cited

U.S. PATENT DOCUMENTS

| | | | |
|---|---|---|---|
| 5,931,935 A * | 8/1999 | Cabrera et al. | 710/260 |
| 5,978,815 A * | 11/1999 | Cabrera et al. | 1/1 |
| 6,230,200 B1 * | 5/2001 | Forecast et al. | 709/226 |
| 6,594,698 B1 * | 7/2003 | Chow et al. | 709/226 |
| 8,031,729 B2 * | 10/2011 | Elzur | 370/412 |
| 2002/0174316 A1 * | 11/2002 | Dale et al. | 711/170 |
| 2003/0115447 A1 * | 6/2003 | Pham et al. | 713/153 |
| 2003/0135709 A1 * | 7/2003 | Niles et al. | 711/220 |
| 2003/0177174 A1 * | 9/2003 | Allen et al. | 709/203 |
| 2004/0073912 A1 * | 4/2004 | Meza | 719/321 |
| 2004/0165588 A1 * | 8/2004 | Pandya | 370/389 |
| 2004/0181594 A1 * | 9/2004 | Suleiman | 709/225 |
| 2006/0236064 A1 * | 10/2006 | Niles et al. | 711/170 |
| 2006/0265529 A1 * | 11/2006 | Kuik et al. | 710/62 |
| 2008/0215742 A1 * | 9/2008 | Goldszmidt et al. | 709/229 |
| 2008/0216082 A1 * | 9/2008 | Eilam et al. | 718/104 |

\* cited by examiner

*Primary Examiner* — Faruk Hamza
*Assistant Examiner* — Oleg Survillo
(74) *Attorney, Agent, or Firm* — Haynes and Boone, LLP (57) ABSTRACT

A method for dynamically allocating a plurality of command processing resources is disclosed. The method generally includes the steps of (A) allocating the command processing resources from a first protocol layer to a first pool of a second protocol layer below the first protocol layer, (B) allocating at least some of the command processing resources from the first pool to a plurality of second pools and (C) sending a particular one of the command processing resources from one of the second pools to the first protocol layer for processing an operation.

18 Claims, 6 Drawing Sheets

DYNAMIC COMMAND CAPACITY ALLOCATION ACROSS MULTIPLE SESSIONS AND TRANSPORTS

FIELD OF THE INVENTION

The present invention relates to a storage area networking generally and, more particularly, to a dynamic command capacity allocation across multiple high level protocols.

BACKGROUND OF THE INVENTION

The small computer system interface (SCSI) storage protocol is being layered on a number of network-based transport protocols. The network-based transport protocols include Fibre Channel, Internet SCSI (iSCSI), and Infiniband. A monolithic driver, with the SCSI layer and the transport layer in the same driver, is currently used on storage devices providing a single transport protocol. A layered driver, with separate SCSI and transport layers, is currently used for storage devices providing multiple transport protocols. A layered driver can also be used for storage devices providing a single transport protocol.

In direct connect storage devices, all command processing resources of the SCSI layer are used for the single system connecting to the storage device. In storage devices connected to storage area networks, the storage device can be shared by multiple systems. Regardless of driver type, the command processing resources of the SCSI layer are being shared across multiple transport layer connections. Current mechanisms allocate fixed resources to each transport layer session. The static allocation mechanism can be extended to support multiple transport layers.

The use of a static allocation mechanism for command processing resources restricts the flexibility of a solution. Each session (i.e., where the session is a transport level construct) has an arbitrary maximum performance based on the statically allocated number of command processing resources. Each transport layer also has an aggregate maximum performance based on the statically allocated number of command processing resources and the number of sessions supported by the allocation. For example, consider a protocol layer that can support 16 independent communications services (i.e., 16 independent I_T Nexi for SCSI). In a static allocation, each transport protocol is given a maximum 8 of the transport level session constructs (i.e., for iSCSI a maximum of 8 sessions and for Fibre Channel a maximum of 8 connections). Thus, an arbitrary division exists between transports. Within the transport the allocation of resources between sessions may also be static. The present invention addresses the dynamic allocation of resources both across transports and within each transport.

SUMMARY OF THE INVENTION

The present invention concerns a method for dynamically allocating a plurality of command processing resources. The method generally comprises the steps of (A) allocating the command processing resources from a first protocol layer to a first pool of a second protocol layer below the first protocol layer, (B) allocating at least some of the command processing resources from the first pool to a plurality of second pools and (C) sending a particular one of the command processing resources from one of the second pools to the first protocol layer for processing an operation.

The objects, features and advantages of the present invention include providing a method and circuit that may (i) adjust an allocation of command processing resources between transport protocols and sessions within each transport protocol, (ii) move command processing resources over time to a transport layer with the most open sessions, (iii) allow each session to have a larger number of command processing resources when a system has few open sessions, (iv) allow reduced session capacity when a large number of sessions are open and/or (v) dynamically adjust a capacity of the sessions and the transport protocols as sessions are opened and closed.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 8:
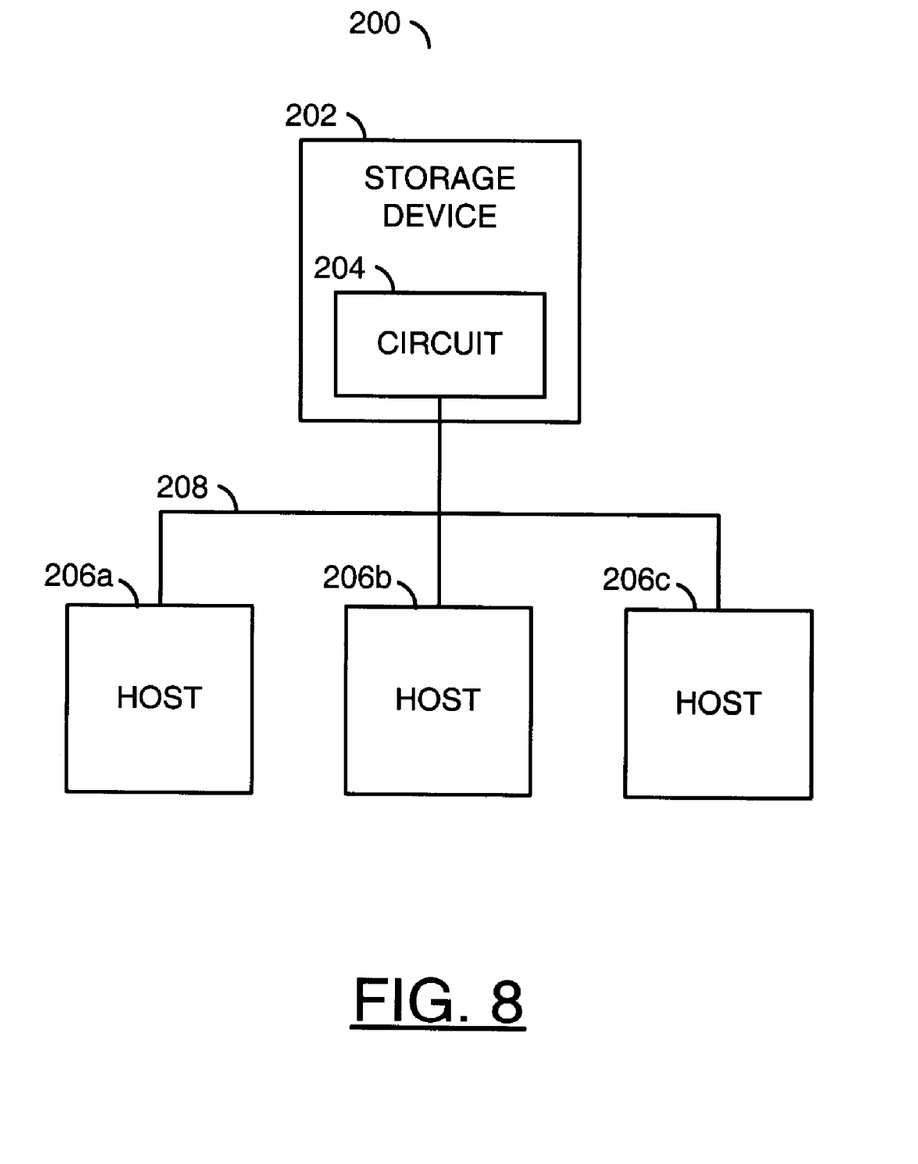
FIG. 8 is a diagram of an example implementation of a storage area network system.

Referring to FIG. 8, a block diagram of an example implementation of a storage area network system 200 is shown. The present invention generally pertains to the field of storage devices 202 (one shown) having a circuit 204 attached to multiple host systems 206a to 206c via a communications network 208, and in particular, storage area networks. The small computer system interface (SCSI) storage protocol may be layered on a number of network-based transport protocols. The network-based transport protocols generally include Fibre Channel, Internet SCSI (iSCSI), and Infiniband. A mechanism may be defined allowing command processing resources (CPRs) of a SCSI layer to be dynamically reallocated as sessions are opened and closed. The present invention generally guarantees a minimal session operation in fully loaded systems while allowing extra command processing capacity for sessions in lightly loaded systems. In a layered driver stack, the present invention generally supports sharing SCSI command processing resources between multiple transport protocols, such as Fibre Channel, Infiniband and Internet SCSI (iSCSI). All session capacity semantics involved with transport credit mechanisms may be preserved, such as the iSCSI sequence number computation.

An iSCSI entity may contain one or more iSCSI targets. Each iSCSI target may support simultaneous access by multiple iSCSI initiators. Each initiator may open an iSCSI session on any iSCSI target on the iSCSI entity for which access has been granted. Fibre Channel and Infiniband may also create multiple connections and multiple sessions to access storage resources. Each session generally represents a single SCSI I_T Nexus. As such, sessions opened substantially simultaneously for a storage device may share the command processing resources for the SCSI layer of the storage device.

In a network storage device with a layered driver architecture, each operation (e.g., SCSI tasks and SCSI task management requests (TMR)) may be transmitted to the SCSI layer using a command processing resource. The command processing resource for a SCSI operation (ScsiOp) generally contains all context of the SCSI operation. While the SCSI operation is in progress, the transport layer may use an input/output request block (IORB) to track execution of the SCSI operation. The SCSI layer generally has a limited number of SCSI operations. Since an amount of state in the I/O request block may be significantly smaller than a state in the SCSI operation, a system may have a significantly larger number of I/O request blocks than a number of SCSI operations.

A maximum number of sessions supported by each transport layer is generally determined by how the SCSI operations are allocated to sessions. In a simple conventional solution, each session is given a fixed number of SCSI operations. The SCSI operations are commonly reused for each command processed. A total number of sessions supported is thus limited to a total number of SCSI operations divided by a number of SCSI operations per session. In conventional systems where multiple transport protocols are supported, the SCSI operations are statically allocated to each transport protocol. Therefore, the performance characteristics of sessions do not change as sessions open and close. All sessions have a fixed maximum performance dictated by the statically assigned SCSI operations. The conventional systems are also incapable of responding to changes in access patterns between different transports. All the static allocation decisions are made a-priori and cannot respond dynamically to usage changes within or across transport layers.

A mechanism to allow a storage device to dynamically adjust operation performance may have one or more of the following characteristics. Each transport layer used by the storage device may reserve a subset of a total number of available SCSI operations. Each particular SCSI operation allocated to a particular transport layer may be released after use. By releasing, the particular SCSI operation may be reallocated to a different transport layer, if not reserved, or back to the originating transport layer. Each session is generally guaranteed an allocation of a minimum number of SCSI operations. Sessions may hold allocated SCSI operations until the SCSI operations have been used. Each session may be allowed to acquire additional SCSI operations after a SCSI operation has completed. The total number of allocations may be up to a session maximum value. The SCSI operation maximum value for sessions may vary dynamically to fairly distribute SCSI operations across sessions in each transport layer. The SCSI operation maximum value generally may not exceed a transport layer specific absolute maximum value. The above characteristics may be applied directly to the iSCSI transport layer. The above characteristics may be used with minimal modification for the Fibre Channel and Infiniband transport protocols.

The present invention generally defines an architecture and/or method that meet the above characteristics. One or more of the following attributes may be implemented in accordance with the present invention. A transport reservation mechanism may be provided in a SCSI operation context structure. An optional transport pool may hold SCSI operation contexts pre-allocated to a transport but not currently assigned to a session. A pool shared by all sessions in a transport holding I/O request block contexts may be used for immediate delivery commands of the transport layer. A pool for each session holding I/O request block contexts may be used for normal delivery commands of the transport layer. An exemplary embodiment of the present invention may include all of the above attributes.

The SCSI operation transport reservation mechanism generally allows each transport layer to reserve a set of SCSI operations. The SCSI operation transport reservation mechanism may inform the SCSI layer that a specific SCSI operation should be returned to a specific transport layer. The SCSI operation transport reservation mechanism may prevent the SCSI layer from allocating a reserved SCSI operation to another transport layer.

During initialization, each transport layer may determine an initial number of SCSI operations to reserve and report the initial number to the SCSI layer. The total number of reserved SCSI operations generally includes (i) a number designated for an immediate I/O request block pool of the transport layer and (ii) a number used to provide each session with a minimum command processing capability. In turn, the SCSI layer generally determines a number of SCSI operations may be unreserved and provides the unreserved number to each transport layer. The unreserved quantity may be the number of SCSI operations available to balance command processing capacity allocations across the various transport layers and sessions dynamically.

Figure 1:
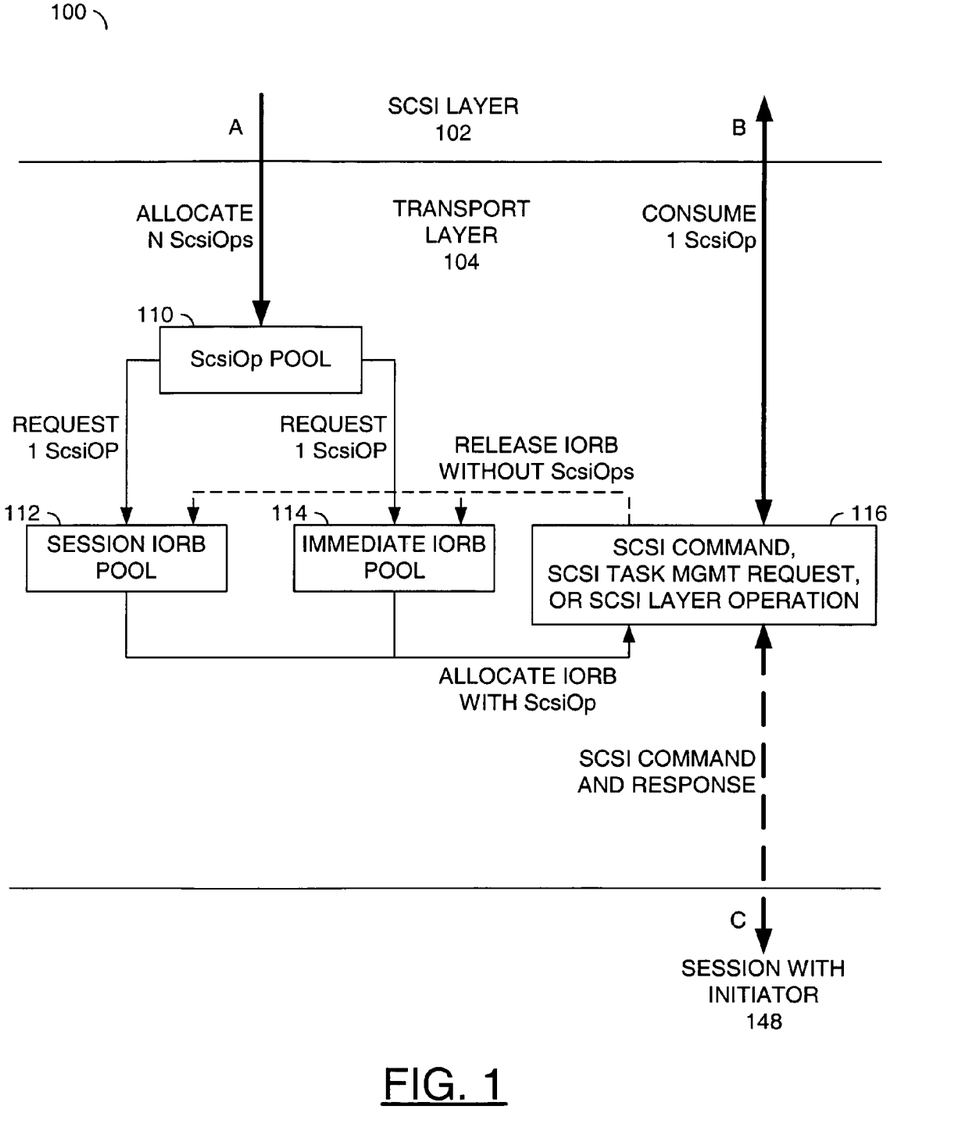
FIG. 1 is a block diagram of an example system for a small computer system interface operation life cycle in accordance with a preferred embodiment of the present invention.

Referring to FIG. 1, a block diagram of an example system 100 for a SCSI operation life cycle is shown in accordance with a preferred embodiment of the present invention. The system 100 generally comprises a SCSI layer 102 and one or more transport layers 104. A signal (e.g., A) may convey one or more SCSI operations allocated from the SCSI layer 102 to a transport layer 104. A signal (e.g., B) may convey one or more SCSI operations from the transport layer 104 to the SCSI layer 102 for processing of an operation. A signal (e.g., C) may convey information to and/or from an initiator of the operation.

Each transport layer 104 generally comprises a first pool (or module) 110, a second pool (or module) 112, a third pool (or module) 114 and a transfer block (or module) 116. The first pool 110 may be referred to as a SCSI operation (ScsiOp) pool. The second pool 112 may be referred to as a session input/output request block (IORB) pool. The third pool 114 may be referred to as an immediate IORB pool. The transfer block 116 may be operational to (i) receive allocated I/O request blocks with linked SCSI operations, (ii) transport the SCSI operations to the SCSI layer 102, (iii) release the I/O request blocks without the SCSI operations and (iv) open/close sessions with the initiator.

The SCSI layer 102 may be implemented per the SCSI specification. Application layers, presentation layers and session layers of the Open Systems Interconnection seven-layer model as well as similar upper level layers and sub-layers of other protocols may be implemented as the layer 102 to meet the criteria of a particular application. The transport layer 104 may be implemented per the Fibre Channel specification, the Internet SCSI specification and/or the Infiniband specification. The transport layer 104 may include a session sub-layer. Transport layers of other transport protocols may be implemented to meet the criteria of a particular application. The ScsiOp pool 110 may be implemented as a list of pre-allocated SCSI operations to reduce overhead of allocation SCSI protocol context from the SCSI layer 102 to the transport layer 104. The session IORB pool 112 and the immediate IORB pool 114 may each be implemented as a list of pre-allocated transport protocol context to minimize allocation and to support transport credit and flow of control mechanisms.

The SCSI operation pool 110 generally requests a set of SCSI operations from the SCSI layer 102 at initialization and whenever the SCSI operation pool 110 is empty or at a predetermined low water mark. The SCSI operation pool 110 may allocate SCSI operations to the immediate IORB pool 114 and one or more session IORB pools 112 (only one shown for clarity) of the transport layer 104, one at a time, as requested by the IORB pools 112 and 114. When a session is closed, the respective session IORB pool 112 may release the associated SCSI operations back to the originating SCSI operation pool 110 rather than the SCSI layer 102. Releasing to another pool within the transport layer 104 generally preserves a small reservoir of SCSI operations for command processing in the transport layer 104.

Some SCSI operations may be released in the SCSI layer 102 as the commands are processed. The flow of SCSI operations as commands are completed may be used to unlink the release of SCSI layer resources from the completion of each command processing by the transport layer 104. The flow may also allow SCSI operations to move between transport layers as demand varies dynamically between the transport layers.

Figure 2:
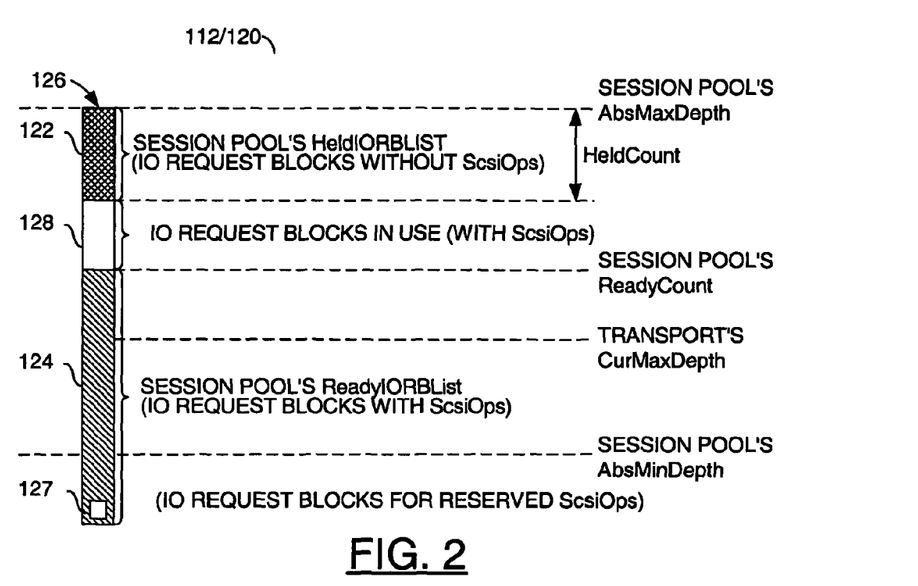
FIG. 2 is a block diagram of an example organization of a transport layer session input/output request block pool.
Figure 3:
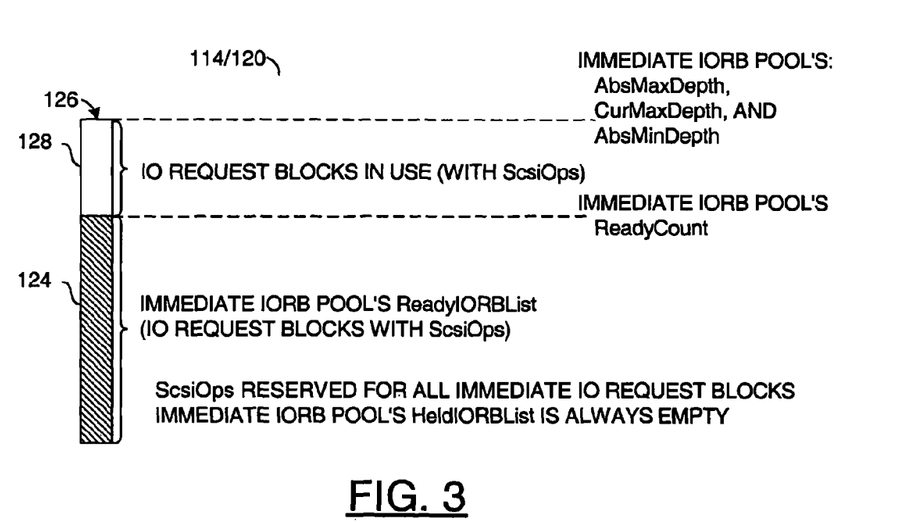
FIG. 3 is a block diagram of an example organization of an immediate input/output request block pool.

Referring to FIGS. 2 and 3, block diagrams of example organizations of a transport layer session IORB pool 112 and an immediate IORB pool 114 are shown. The transport layer session IORB pool (or "session IORB pool" for short) 112 and the immediate IORB pool 114 may have a similar structure. Each of the session IORB pool 112 and the immediate IORB pool 114 may generically be referred to as an IORB pool 120, IORB pools 120 and IORB pools 112/114, unless otherwise noted. Each IORB pool 120 generally comprises multiple elements (or values) described in more detail below.

One or more elements (e.g., HeldIORBList) may form a held list 122. The held list 122 generally comprises I/O request blocks for which SCSI operations are not available. The held IORBs may be linked to SCSI operations when a dynamic capacity of the IORB pool 120 is increased.

One or more elements (e.g., ReadyIORBList) may form a ready list 124. The ready list 124 generally comprises I/O request blocks for SCSI operations that have been allocated. The ready I/O request blocks may be available for incoming SCSI command requests, task management requests, SCSI layer management requests and other similar requests.

An element (e.g., AbsMaxDepth) may define a maximum number of I/O request blocks in the IORB pool 120. The element AbsMaxDepth may have a different value for (i) each transport protocol, (ii) each of the immediate IORB pools 114 and (iii) each of the session IORB pools 112 within the same transport layer 104.

An element (e.g., AbsMinDepth) may define a number of I/O request blocks in the IORB pool 120 for which SCSI operations are reserved. The element AbsMinDepth may have a different value for (i) each transport protocol, (ii) each of the immediate IORB pools 114 and (iii) each of the session IORB pools 112 within the same transport.

An element (e.g., CurMaxDepth) may define a number of I/O request blocks for which SCSI operations are available when SCSI operations are generally equitably distributed across all IORB pools 120. The element CurMaxDepth value may reference a number common to all session IORB pools 112 in a transport layer 104.

An element (e.g., HeldCount) may define a number of I/O request blocks in the held list 122. The element HeldCount may store a held number. The element HeldCount value generally determines how many SCSI operations may be reallocated to the originating IORB pool 120 during a refill operation. The element HeldCount number may indicate how may I/O request blocks do not have an associated SCSI operation.

An element (e.g., ReadyCount) may define a number of I/O request blocks in the ready list 124. For session IORB pools 112, the element ReadyCount generally defines a current command processing capacity of the session. For the immediate IORB pool 114, the value ReadyCount generally defines a number of immediate delivery SCSI commands and task management requests that may be processed.

Bars 126 (one in each of FIGS. 2 and 3) graphically represent all I/O request blocks available to the IORB pool 120. I/O request blocks (e.g., IORB 127) that have SCSI operations residing in the ready list 124 may be indicated at a bottom part of the bar 126. I/O request blocks in use by a session for command processing are generally indicated by a middle part 128 of the bar 126. I/O request blocks that do not have SCSI operations residing in the held list 122 may be indicated in an upper part of the bar 126. Note that the held list 122 for the immediate IORB pool 114 may always be empty since an absolute minimum depth value (AbsMinDepth) of the immediate IORB pool 114 and a current maximum depth value (CurMaxDepth) may be always equal to an absolute maximum depth value (AbsMaxDepth).

The value ReadyCount is generally a length of the ready list 124. The value ReadyCount may represent the unused command capacity of a session. The value ReadyCount and the value CurMaxDepth may be compared when an I/O request block is released to determine if the released I/O request block should be reallocated a SCSI operation. The value HeldCount is generally a length of the held list 122. The value HeldCount may represent available I/O request blocks without SCSI operations. A difference between the value AbsMaxDepth and the value CurMaxDepth may be compared with the value HeldCount to determine if the IORB pool 120 should accumulate SCSI operations when an I/O request block is returned to the IORB pool 120 after the completion of a SCSI operation.

Each IORB pool 120 may be created with an AbsMaxDepth number of I/O request blocks. For session IORB pools 112, the value AbsMaxDepth generally defines an absolute maximum command capacity of the sessions for a transport layer. For an immediate IORB pool 114, the value AbsMaxDepth generally defines an absolute maximum number of immediate delivery SCSI tasks, SCSI task management requests and SCSI layer management operations that may be processed by the transport layer 104.

Each IORB pool 120 may have an AbsMinDepth number of SCSI operations reserved for future use. For the session IORB pools 112, the value AbsMinDepth may be set to a minimum number of SCSI operations used to operate the transport protocol session. For an immediate IORB pool 114, the value AbsMinDepth may be set to a minimum number of SCSI operations used for the immediate command operation of the transport layer 104.

Each session IORB pool 112 may have at most a CurMaxDepth number of I/O request blocks with SCSI operations allocated to fairly spread the SCSI operations of the SCSI layer 102 across all active sessions. The value CurMaxDepth is generally held in a quantity (e.g., SessionMaximumPoolDepth) for the transport layer 104. The value CurMaxDepth for a session IORB pool 112 may be recomputed each time a session is created or destroyed. A field holding the value CurMaxDepth of each session IORB pool 112 generally references the quantity SessionMaximumPoolDepth for the transport layer 104. The immediate IORB pool 114 may have a value CurMaxDepth set similar to the value AbsMaxDepth and the value AbsMinDepth for the immediate IORB pool 114. The value CurMaxDepth for an immediate IORB pool 114 generally does not change as sessions are created and destroyed. Thus, the value CurMaxDepth for the immediate IORB pool 114 may reference the value AbsMaxDepth element for the immediate IORB pool 114.

The dynamic capacity allocation mechanism generally uses the following transport layer 104 wide quantities. Each transport layer 104 may have a unique set of element values. An element (e.g., MaximumNumberSessions) may define a value for a maximum number of simultaneous sessions supported by the transport layer 104. An element (e.g., NumberScsiOps) may define a value for a total number of SCSI layer 102 SCSI operations available in the storage device. An element (e.g., NumberReservedImmediateSsciOps) may define a value for a number of SCSI operations reserved by the transport layer 104 for (i) SCSI tasks and SCSI task management requests marked for immediate delivery and (ii) SCSI layer management operations originating in the transport layer 104. An element (e.g., NumberReservedSessionScsiOps) may define a value for a number of SCSI operations reserved by a particular transport layer 104 for minimal operation of sessions within the particular transport layer 104. An element (e.g., NumberAvailableScsiOps) may define a value for a number of SCSI operations not reserved by any transport layer 104. The unreserved SCSI operations are generally available for dynamically balancing session command processing capacity across the sessions of the transport layers 104.

An element (e.g., AbsoluteMaximumPoolDepth) may define a value for a maximum depth of the session IORB pools 112. The value AbsoluteMaximumPoolDepth generally defines the maximum command queue depth of the sessions in a transport layer 104. An element (e.g., AbsoluteMinimumPoolDepth) may define a value for a minimum depth of session IORB pools 112. The value AbsoluteMinimumPoolDepth generally defines the number of SCSI operations reserved for minimum acceptable operation of the sessions in a transport layer 104. An element (e.g., SessionMaximumPoolDepth) may define a value for a dynamically adjusted session IORB pool 112 maximum pool depth. The value SessionMaximumPoolDepth may always reside between the value AbsoluteMaximumPoolDepth and the value AbsoluteMinimumPoolDepth inclusively. An element (e.g., SessionIORBPoolCount) may define a value for a number of active session IORB pools 112. The value SessionIORBPoolCount may be updated as session IORB pools 112 are created and destroyed for the sessions of the transport layer 104. The above quantities are generally initialized when the transport layer 104 is initialized and used to initialize the immediate IORB pool 114 and the session IORB pool 112 elements as session IORB pools 112 are created and destroyed for the sessions of the transport layer 104.

The SessionMaximumPoolDepth transport wide quantity is generally recomputed as transport sessions are opened and closed as follows:

When SessionIORBPoolCount is greater than zero, then

Figure 4:
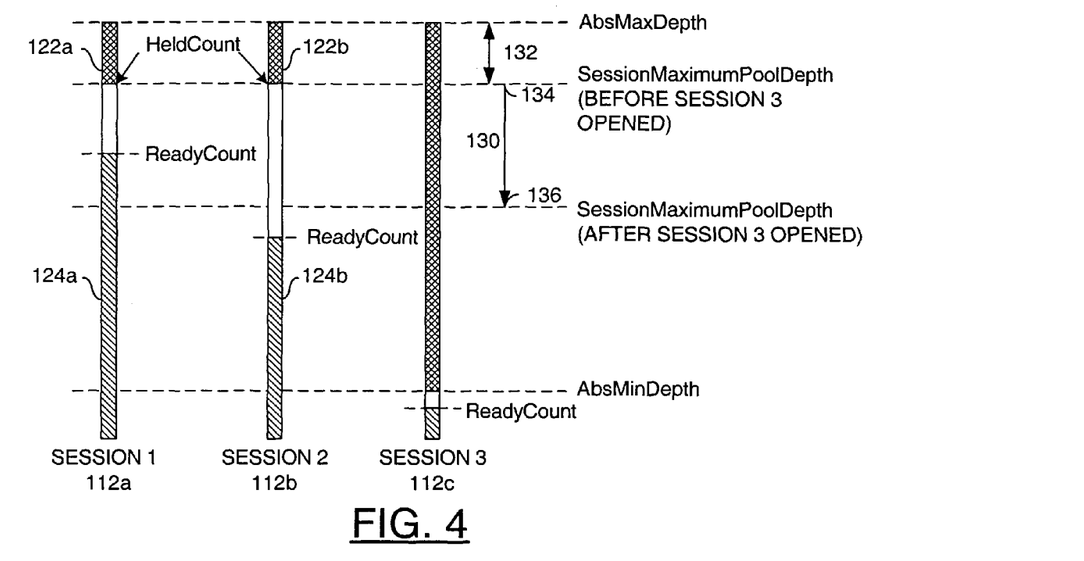
FIG. 4 is a block diagram illustrating an example opening of a session.

SessionMaximumPoolDepth=(NumberAvailableScsiOps/SessionIORBPoolCount)+AbsoluteMinimumPoolDepth and when SessionIORBPoolCount is zero, then SessionMaximumPoolDepth=AbsoluteMaximumPoolDepth Referring to FIG. 4, a block diagram illustrating an example opening of a session is shown. In particular, a relationship between the element SessionMaximumPoolDepth and the other elements in session IORB pools 112a-112c are shown. The session IORB pools 112a and 112b may be already open in the example when the new session pool 112c opens.

When a session 3 and an associated session IORB pool 112c are opened, the value SessionMaximumPoolDepth generally decreases (as indicated by arrow 130) if more I/O request blocks are present in all of the sessions (e.g., session 1, session 2 and session 3) than SCSI operations available in the system 100. All sessions (e.g., session 1 and session 2) that were open before the new session 3 opens may have more than a fair allocation of SCSI operations. As such, the common fair allocation may be lowered across all session IORB pools 112a-112c to accommodate the new session 3. In the example illustrated, a length 132 of the held lists 122a and 122b for session 1 and session 2 may expand as the value SessionMaximumPoolDepth drops from a value 134 to a value 136. If the ready lists 124a and/or 124b end above the new SessionMaximumPoolDepth value 136 (e.g., session 1), the associated session IORB pool 112 (e.g., 112a) may be considered to have an over allocation of SCSI operations. A session IORB pool 112 (e.g., 112a) with too many SCSI operations generally does not reclaim SCSI operations for I/O request blocks as SCSI operations are completed. Instead, completed SCSI operations may be left in the SCSI layer 102 for reallocation to other IORB pools 120. If the ready lists 124a and/or 124b end below the new SessionMaximumPoolDepth value 136 (e.g., session 2 and session 3), the associated session IORB pool 112 (e.g., 112b and 112c) may be considered to have less that a fair share of SCSI operations. Allocation of additional SCSI operations up to the SessionMaximumPoolDepth value 136 may be accomplished as part of a refill operation.

Figure 5:
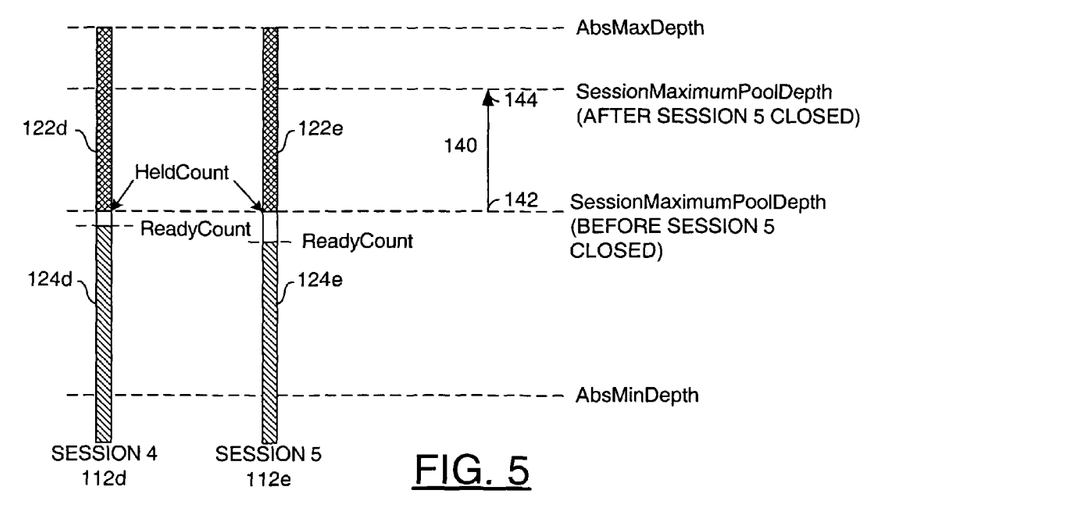
FIG. 5 is a block diagram illustrating an example closing of a session.

Referring to FIG. 5, a block diagram illustrating an example closing of a session is shown. Both session IORB pools 112d and 112e may be already open in the example when the session IORB pool 112e closes.

When a particular session (e.g., session 5) is closed, the value SessionMaximumPoolDepth in the remaining open session IORB pools 112 (e.g., 112d) generally-increases (as indicated by arrow 140) as the SCSI operations allocated to the closed session are redistributed throughout the system 100. All sessions remaining open (e.g., session 4) after the particular session closes may have less than a newly calculated fair allocation of SCSI operations. For example, the value SessionMaximumPoolDepth may move from a value 142 below a held list 122d to a value 144 within the held list 122d. As I/O request blocks are returned to the session IORB pool 112d with an under allocation of SCSI operations, new SCSI operations are acquired by the session IORB pool 112d. The session IORB pool 112d generally uses a modified greedy process to reallocate and gain additional SCSI operations. When an I/O request block is released and the session IORB pool 112d is below the fair share value 144 of SCSI operations, the session IORB pool 112d may allocate SCSI operations to I/O request blocks in the held list 122d until (i) the fair share value 144 is obtained, (ii) a refill limit is reached or (iii) no more SCSI operations are available to acquire.

Referring again to FIG. 1, the transport layer 104 may pre-allocate a set (e.g., AbsMinDepth or some other value) of SCSI operations to reduce an overhead of reallocating SCSI operations. The pre-allocated SCSI operations are generally held in the SCSI operation pool 110. As each immediate IORB pool 114 and session IORB pools 112 are created, each immediate IORB pool 114 and session IORB pool 112 may allocate SCSI operations, one at a time, from the SCSI operation pool 110. Allocation may continue until the IORB pools 112/114 reaches either a respective current maximum I/O request block depth or until there are no more SCSI operations available. Note that the transport layer 104 generally has reserved a minimum number of SCSI operations so each IORB pool 112/114 may allocate at least a predetermined minimum number (e.g., AbsMinDepth) of SCSI operations.

As a number of requested operations are received from a SCSI initiator 148 via the signal C over the transport layer 104 or if the transport layer 104 generates a SCSI layer management operation, a similar number of I/O request blocks with associated SCSI operations may be allocated from an IORB pool 112/114 to track the requested operations. Each I/O request block may be taken from either (i) the shared immediate IORB pool 114 for immediate delivery operations or (ii) a session specific IORB pool 112. A reservation characteristic of each SCSI operation pulled from an IORB pool 112/114 may be set if a depth (ReadyCount) for the originating IORB pool 112/114 is below the minimum depth for maintaining session operation. From the transfer block 116, the SCSI operation may be sent to the SCSI layer 102. Upon completion of the requested operation, the associated SCSI operation may be released to the SCSI layer 102 and the I/O request block may be returned to the originating IORB pool 112/114 from which allocated. A reserved SCSI operation may be returned to the originating transport layer 104. The IORB pools 112/114 generally allocate new SCSI operations from the SCSI operation pool 110 only when fewer than the fair share of SCSI operations remain. In the life cycle, the dynamic capacity allocation may be implemented entirely in the allocation and release processes of the IORB pools 112/114 with cooperation from the SCSI layer 102 for reallocating reserved SCSI operations back to transport layer 104 requesting the reservation.

Figure 6:
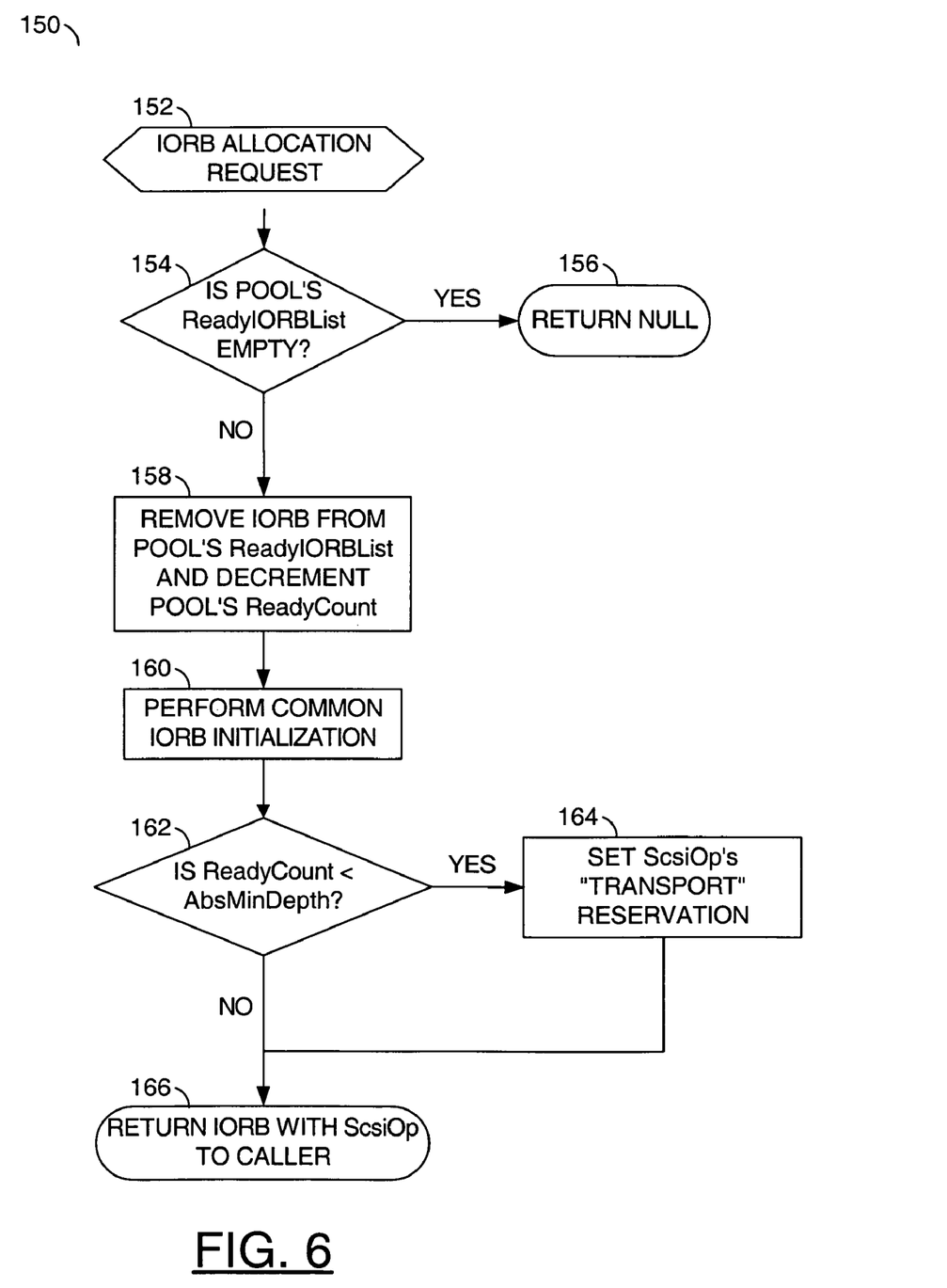
FIG. 6 is a flow diagram of an example implementation of an allocation method.

Referring to FIG. 6, a flow diagram of an example implementation of an allocation method 150 is shown. The allocation method (or process) 150 generally comprises a block (or step) 152, a block (or step) 154, a block (or step) 156, a block (or step) 158, a block (or step) 160, a block (or step) 162, a block (or step) 164 and a block (or step) 166. The allocation method 150 generally begins with a receipt of a request from a caller (e.g., initiator 148) for an IORB allocation (e.g., block 152) via signal C. The ready list 124 of an IORB pool 120 may be checked (e.g., decision block 154) to determine if empty. If the ready list 124 is empty (e.g., the YES branch of decision block 154), the IORB pool 120 generally returns a NULL indication (e.g., block 156) via signal C to indicate that no resources (e.g., no command processing capacity) may be available to satisfy the request. Any unique value distinguishable from a valid resource may be used as the return value. Otherwise (e.g., the NO branch of decision block 154), a first I/O request block may be removed from the ready list 124 and the value ReadyCount is decremented (e.g., block 158).

All common I/O request block initializations may be done automatically (e.g., block 160) so that the caller is free from handling the initializations. If the ReadyCount is less than the absolute minimum depth (AbsMinDepth) for the IORB pool 120 (e.g., the YES branch of decision block 162), the SCSI operation associated with the I/O request block may be marked as reserved for reallocation to the transport layer 104 of the originating IORB pool 120 (e.g., block 164). Since the absolute minimum depth of the IORB pool 120 for immediate delivery commands may be similar to the number of IORBs in the IORB pool 120, the transport reservation may always be set for I/O request blocks allocated from the immediate IORB pool 114. After reservation of the SCSI operation or if the value ReadyCount is greater than or equal to the value AbsMinDepth (e.g., the NO branch of decision block 162), the initialized IORB with an associated SCSI operation may be returned to the caller (e.g., block 166).

Figure 7:
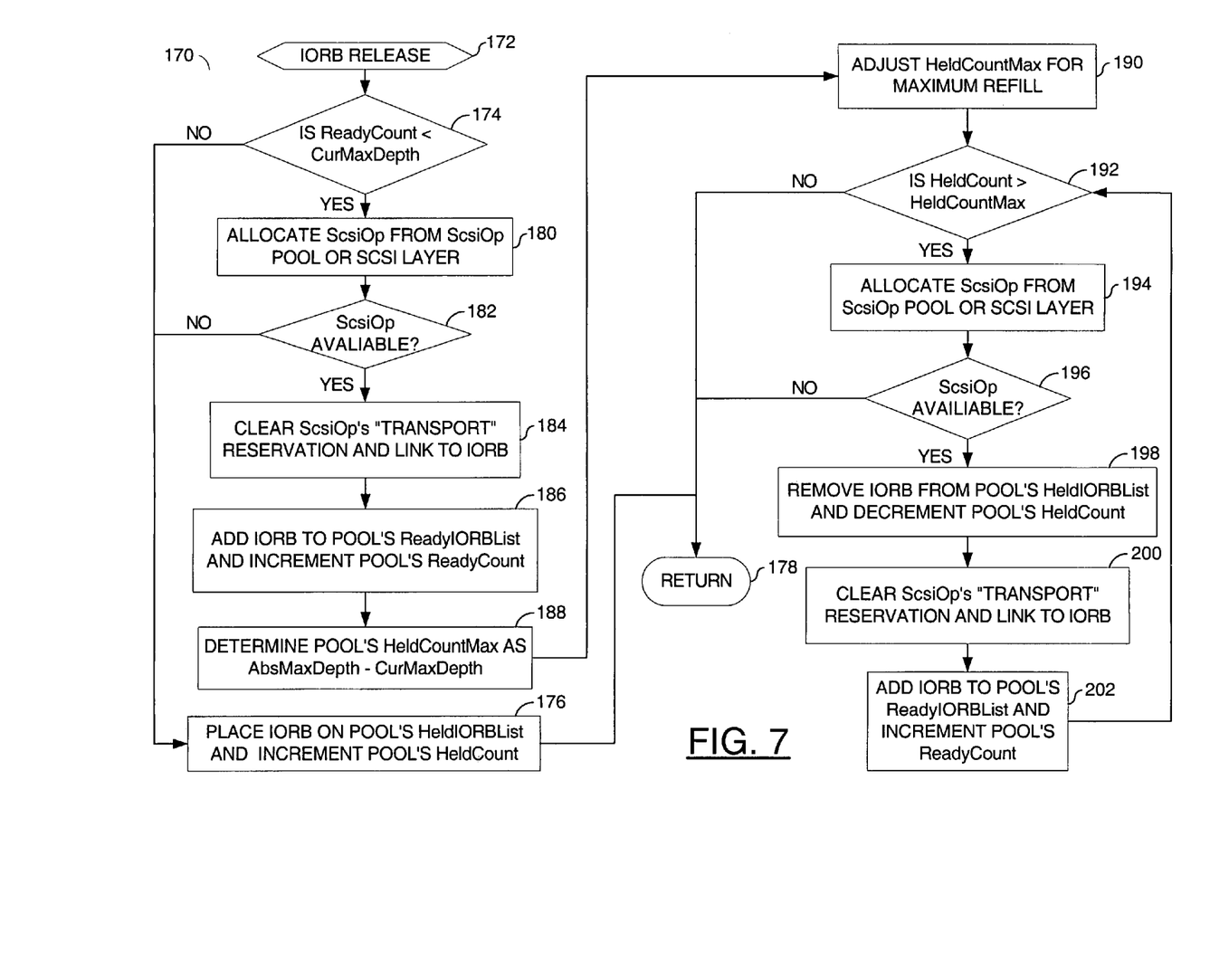
FIG. 7 is a flow diagram of an example implementation of a release method.

Referring to FIG. 7, a flow diagram of an example implementation of a release method 170 is shown. The release method 170 generally comprises a block (or step) 172, a block (or step) 174, a block (or step) 176, a block (or step) 178, a block (or step) 180, a block (or step) 182, a block (or step) 184, a block (or step) 186, a block (or step) 188, a block (or step) 190, a block (or step) 192, a block (or step) 194, a block (or step) 196, a block (or step) 198, a block (or step) 200 and a block (or step) 202.

An I/O request block is always released to same IORB pool 120 from which the I/O request block was allocated. On release (e.g., block 172), the value ReadyCount of the originating IORB pool 120 may be compared with the value CurMaxDepth (e.g., decision block 174). If the value ReadyCount is not less than the value CurMaxDepth (e.g., the NO branch of decision block 174), the IORB pool 120 may have an over allocation of SCSI operations. Therefore, the I/O request block may be placed in the held list 122 and the value HeldCount may be incremented (e.g., block 176). The release method 170 may then be considered completed (e.g., block 178). Otherwise (e.g., the YES branch of decision block 174), an attempt to allocate a replacement SCSI operation from the SCSI operation pool 110 or SCSI layer 102 may be performed (e.g., block 180). If no SCSI operation is available (e.g., the NO branch of decision block 182), the I/O request block may be placed in the held list 122 and the value HeldCount incremented (e.g., block 176). The release may then be completed (e.g., block 178). If a SCSI operation is available (e.g., the YES branch of decision block 182), the transport reservation mark of the SCSI operation may be cleared (if set) and the SCSI operation linked to the I/O request block (e.g., block 184). The I/O request block may then be placed in the ready list 124 and the value ReadyCount may be incremented (e.g., block 186). For an immediate IORB pool 114, the I/O request block may always receive a new SCSI operation and the I/O request block may be placed in the ready list 124.

After the released I/O request block is added to the ready list 124, the IORB pool 120 generally implements a "greedy" refill process to obtain as many SCSI operations as possible. The greedy refill process may calculate the value HeldCountMax by subtracting the value CurMaxDepth from the value AbsMaxDepth (e.g., block 188). The value HeldCountMax may be adjusted to reflect the maximum refill if the IORB pool 120 is implementing a modified greedy refill process (e.g., block 190). For an immediate IORB pool 114, the value HeldCountMax may always be zero and the held list 122 may always be empty. Next, a sequence of I/O request blocks may be moved from the held list 122 to the ready list 124 (e.g., blocks 192-202) until the held list 122 is either (i) reduced to a maximum length (e.g., the NO branch of decision block 192) or (i) no more SCSI operations are available (e.g., the NO branch of decision block 196). If the value HeldCount is not greater than the value HeldCountMax (e.g., the No branch of decision block 192), the release method 170 may be completed (e.g., block 178). Otherwise (e.g., the YES branch of decision block 192), an attempt may be made to allocate an additional SCSI operation from the SCSI operation pool 110 or SCSI layer 102 (e.g., block 194). If no SCSI operation is available (e.g., the NO branch of decision block 196), the release method 170 may be completed (e.g., block 178). Otherwise (e.g., the YES branch of decision block 196), an I/O request block may be removed from the held list 122 and the value HeldCount may be decremented (e.g., block 198). The SCSI operation transport reservation may also be cleared (if set) and the SCSI operation linked to the I/O request block (e.g., block 200). Afterwards, the I/O request block may be placed in the ready list 124 of the IORB pool 120 and the value ReadyCount may be incremented (e.g., block 202). The release method 170 generally repeats comparing the decremented value HeldCount to the previously computed value HeldCountMax (e.g., back to decision block 192).

In a driver stack with multiple transport layers, each transport layer 104 may use different I/O request block contexts. The IORB pools 120 for each transport layer 104 generally contain the unique I/O request block for the transport layer 104. The IORB pools 120 may use a union of all I/O request block contexts, a subclass mechanism, or have unique I/O request blocks depending on the implementation language. Combinations of the above aspects may vary from implementation to implementation within the scope of the present invention.

The present invention may have the following advantages when compared with a traditional static command processing capacity allocation scheme. A command processing capacity of a storage device may be adjusted dynamically across multiple transports. The command processing capacity may be adjusted dynamically across sessions within a single transport. The storage device may provide additional command processing capacity to each session when the system is lightly loaded. The storage device generally provides a guaranteed minimum command processing capacity to a larger number of sessions. Implementation of the present invention generally adds just a small overhead for allocating and releasing I/O request block contexts when compared with a static allocation scheme.

The function performed by the flow diagrams of FIGS. 1, 6 and 7 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMs, Flash memory, magnetic or optical cards, or any type of media suitable for storing electronic instructions. As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the spirit and scope of the invention.

The invention claimed is:

1. A method for dynamically allocating a plurality of command processing resources in a storage device, comprising the steps of:
   (A) allocating a plurality of operations to a first pool in response to a plurality of transport layer sessions being initially established between said storage device and at least one host, wherein:
      (i) said first pool is accessible only by the plurality of sessions of same transport,
      (ii) each of said operations utilizes at least some of said command processing resources, and
      (iii) said command processing resources are configured to process the plurality of operations received by said storage device from said at least one host;
   (B) opening a plurality of sessions between said at least one host and said storage device;
   (C) allocating an initial amount of said operations from said first pool to a plurality of second pools, wherein each of said plurality of sessions is associated with a corresponding second pool of the plurality of second pools;
   (D) closing one of said plurality of sessions;
   (E) in response to said closing of said one of said sessions, releasing operations allocated to the closed session from the corresponding second pool back to said first pool; and
   (F) dynamically adjusting the allocation of said command processing resources between said sessions that are still open by re-allocating said released operations from said first pool to a plurality of second pools corresponding to said sessions that are still open up to a maximum value for each said open session.

2. The method according to claim 1, further comprising the steps of:
   linking a plurality of request blocks with said plurality of operations in said plurality of second pools; and
   sending a particular one of said request blocks linked with a particular one of said operations from a particular one of said second pools to a transfer module to authorize processing of a particular one of said operations.

3. The method according to claim 2, further comprising the step of:
   transferring said particular request block from said transfer module back to said particular second pool in response to completing said particular operation.

4. The method according to claim 2, further comprising the step of:
   transferring said particular operation to said first pool in response to completing said particular operation.

5. The method according to claim 4, further comprising the step of:
   returning said particular operation from said first pool to the particular one of said second pools.

6. The method according to claim 1, wherein said storage device implements a small computer system interface storage protocol.

7. The method according to claim 1, wherein said first pool receives said operations that are pre-allocated to said plurality of sessions of same transport.

8. The method according to claim 1, wherein a third pool receives a subset of said plurality of operations from said first pool to provide additional processing capacity to said sessions.

9. The method according to claim 1, further comprising the step of:
   creating a new second pool in addition to said plurality of second pools corresponding to a newly opened session of the same transport as said plurality of sessions.

10. The method according to claim 9, further comprising the step of:

re-allocating a portion of operations from said plurality of existing second pools to said new second pool to provide a processing capacity to said newly opened session.

11. A storage device for dynamically allocating a plurality of command processing resources, comprising:
   a circuit configured to:
   (i) allocate a plurality of operations to a first pool in response to a plurality of transport layer sessions being initially established between said storage device and at least one host, wherein:
      (a) said first pool is accessible only by the plurality of sessions of same transport,
      (b) each of said operations utilizes at least some of said command processing resources of said storage device, and
      (c) said command processing resources are configured to process the plurality of operations received by said storage device from said at least one host,
   (ii) open a plurality of sessions between said at least one host and said storage device,
   (iii) allocate an initial amount of said operations from said first pool to a plurality of second pools, wherein each of said sessions is associated with a corresponding second pool of the plurality of second pools,
   (iv) close one of said plurality of sessions,
   (v) in response to closing of said one of said sessions, release operations allocated to the closed session from the corresponding second pool back to said first pool, and
   (vi) dynamically adjust the allocation of said command processing resources between said sessions that are still open by re-allocating said released operations from said first pool to a plurality of second pools corresponding to said sessions that are still open up to a maximum value for each said open session.

12. The storage device according to claim 11, wherein said circuit is further configured to:
   (vii) link a plurality of request blocks with said plurality of operations in said plurality of second pools, and
   (viii) send a particular one of said request blocks linked with a particular one of said operations from a particular one of said second pools to a transfer module to authorize processing of a particular one of said operations.

13. The storage device according to claim 12, wherein said circuit is further configured to transfer said particular request block from said transfer module back to said particular second pool in response to completing said particular operation.

14. The storage device according to claim 12, wherein said circuit is further configured to transfer said particular operation to said first pool in response to completing said particular operation.

15. The storage device according to claim 14, wherein said circuit is further configured to return said particular operation from said first pool to the particular one of said second pools.

16. The storage device according to claim 11, wherein said first pool receives said operations that are pre-allocated to said plurality of sessions of same transport.

17. The storage device according to claim 11, wherein a third pool receives a subset of said plurality of operations from said first pool to provide additional processing capacity to said sessions.

18. The storage device according to claim 11, wherein said circuit is further configured to:
   (i) create a new second pool in addition to said plurality of second pools corresponding to a newly opened session of the same transport as said plurality of sessions, and
   (ii) re-allocate a portion of operations from said plurality of existing second pools to said new second pool to provide a processing capacity to said newly opened session.

* * * * *